United States Patent [19]
Symons et al.

[11] Patent Number: 5,855,272
[45] Date of Patent: Jan. 5, 1999

[54] STORAGE OF SENSITIVE MEDIA

[76] Inventors: Richard Daniel Symons, Flat 2, 133 Randolph Avenue, London W9 1JZ; Robert James Matthews, 34 Coniston Road, Barnehurst, Bexleyheath, Kent; Toby Alan Manchip, 84 Antdace Park, Bromley, Kent BR1 3HD, all of Great Britain

[21] Appl. No.: 817,806
[22] PCT Filed: Sep. 29, 1995
[86] PCT No.: PCT/GB95/02316
    § 371 Date: May 2, 1997
    § 102(e) Date: May 2, 1997
[87] PCT Pub. No.: WO96/10824
    PCT Pub. Date: Apr. 11, 1996

[30] Foreign Application Priority Data

Sep. 30, 1994 [GB] United Kingdom ............. 9419765

[51] Int. Cl.⁶ ............................................. B65D 81/28
[52] U.S. Cl. .................... 206/213.1; 206/307; 206/524.4
[58] Field of Search ........................... 206/213.1, 307, 206/315.9, 522, 524.4

[56] References Cited

U.S. PATENT DOCUMENTS

| | | | |
|---|---|---|---|
| 4,101,029 | 7/1978 | Feinberg et al. | 206/315.9 |
| 4,428,478 | 1/1984 | Hoffman | 206/315.9 |
| 5,002,196 | 3/1991 | Bassili | 206/315.9 |
| 5,320,218 | 6/1994 | Yamashita et al. | 206/213.1 |

Primary Examiner—David T. Fidel
Attorney, Agent, or Firm—Darby & Darby

[57] ABSTRACT

A media storage container has a body portion, a lid, and an injection valve which enables the injection of a protective atmosphere into the interior of the container from outside the container. A vent enables the escape of atmosphere from within the container when the protective atmosphere is injected into the container at a pressure higher than the ambient atmosphere outside the container. Co-acting first formations on the body portion and lid constitute a cam closure mechanism in which, in a first position, the lid is a loose, unsealed fit on the body portion enabling venting of the container while continuing to inject protective atmosphere to allow the inside of the container to be purged, and in a second position the camming action of the closure mechanism seals the lid to the body portion to enable the cavity to be pressurized.

12 Claims, 6 Drawing Sheets

STORAGE OF SENSITIVE MEDIA

FIELD OF THE INVENTION

This invention relates to the storage of sensitive media, particularly to the storage of blank or recorded magnetic and optical media and film.

BACKGROUND OF THE INVENTION

In recent years, there has been a major expansion in the technology of information storage on recordable media. Principal such media are magnetic tapes and optically readable discs and film. Although magnetic tape recording and more recently optical data storage techniques have been around for some time, it is only in relatively recent years that concern has arisen with respect to the long-term stability of such media during storage which can adversely affect the integrity and readability of the data. This arises in some cases from long-term slow degradation of the polymeric material constituting the tape backing or the matrix in which optically readable bits have been impressed or otherwise provided. In some cases, other components of the recording medium may constitute a source of degradation themselves, but it is widely reckoned that in all cases, a major problem source is interaction with the environment, both with oxygen in the atmosphere and with other components which, although they may be present in very small concentrations, have an effect over long time scales. One example of this is moisture or water vapour.

The classical approach to preserving recorded media, for example adopted widely in the film industry, is to store reels on which the media is wound in tins or similar canisters. These are not airtight, and the atmosphere within the tin corresponds to the ambient atmosphere when it is closed, and thus contains oxygen moisture, pollutants, air borne particulates and proportions of sundry other ambient components. Relative airtightness can be provided by, e.g. placing an adhesive tape around the line between the edge of the lid and the base, but this does not prevent deterioration.

It is known to preserve the properties of internally pressurised balls by storing them in a container which is itself pressurised. The time for which the balls need to be kept under pressure is relatively small, weeks or months, and the containers are not designed for re-use or long-term archival storage. Examples of pressurised tennis ball containers are known from WO93/20901, DE-A-3805008, DE-A-4001610 and DE-A-4106374.

It is also known to preserve ultra-sensitive materials, particularly semiconductor wafers, from deterioration arising from external influences by locating them in a sealed container and placing them under partial vacuum surrounded by an inert atmosphere, see GB-A-2262513. Such containers are not designed for long-term archival storage, but rather merely to enable wafers to be transported without contamination from one processing step to another.

According to a first feature of the present invention, there is provided a method of long-term storage of recorded or recordable media which comprises placing the media in a sealable container, purging the interior of the container of atmosphere by introducing into the interior of the container a preservative atmosphere at a pressure greater than ambient atmospheric pressure while venting the interior of the container to atmosphere, sealing the container, introducing further preservative atmosphere until the container is pressurised to the desired degree, and leaving the media within the container under pressure of the preservative atmosphere for the desired storage period.

While clearly it is possible to use and adapt a variety of known types of storage container for such purposes, it is preferred and substantially more efficient to use for such storage a container which is especially adapted for the purpose. Accordingly, in a second aspect, the present invention provides a media storage container comprising at least two relatively movable parts, the parts being movable from a position in which a medium to be preserved may be put into or extracted from the container and a position in which the parts form a closed sealed container about the medium, an injection valve enabling the injection of a protective atmosphere into the interior of the container under pressure, venting means enabling the escape of atmosphere from within the container when the protective atmosphere is injected into the container at a pressure higher than the ambient atmosphere outside the container, and means for sealing the container while continuing to inject protective atmosphere to allow the inside of the container to be pressurised.

The venting means may be an exhaust valve located on a part of the container or, for example, may be constituted by so configuring the parts of the container that they may be loosely held together without sealing enabling atmosphere to be exhausted from the container, moving past the seal, whereafter the container parts may be finally moved into a sealing position.

The exhaust valve, if present, may be one which opens automatically in response to a given excess of pressure between the interior and exterior of the container when it is closed, which will act automatically to prevent over-pressurisation of the interior, or it may be operable between open and closed positions. Alternatively, over-pressurisation may be avoided by feeding the protective atmosphere into the closed container via a pressure reduction valve of known type, e.g. from such pressure gas cylinder via a valve which, once the back pressure reaches a predetermined level, emits to atmosphere.

Preferably, the container includes means for indicating the pressure inside the container relative to the pressure on the exterior. Such means may be used to check, e.g. that a slightly pressurised container has not become de-pressurised relative to ambient atmosphere. Most preferably, the container has incorporated within it a visually observable indicator giving a clear indication distinguishing between three conditions: the pressure inside the container is substantially equal to the atmospheric pressure outside it; the pressure within the container is within a desired range of pressure above ambient pressure; or the pressure within the container is too high. The advantage of a three-state indicator of this type is that the user of the container can see easily if the container is over-pressurised or has leaked. Over-pressurisation is undesirable since it places excess demands on the seal which can lead to failure of the seal and the return of the pressure within the interior of the container to atmospheric and, because the seal has failed, exchange between the ambient atmosphere and the atmosphere within the container.

The container may be made from any convenient material and may be sealed by any convenient known sealing method or construction. The sealing method is preferably one which provides a seal which is easily broken and easily resealable, so that archived material may be retrieved as necessary, inspected or copied, and then returned to the container which is then purged, resealed and re-pressurised. Most preferably the container is in the form of a two-piece casing having mating surfaces provided with a low pressure resistant seal, e.g. formations on one or both surfaces to provide an integral seal or provision of a separate strip, o-ring or the like of soft elastomeric material. Such containers may be easily produced in very large numbers and to high dimensional tolerances. Both pieces of the casing may be made by moulding from plastics materials or, for example, the casing may consist of a plastics moulding defining the media storage cavity and a metal lid adapted to fit thereon.

Such casings differ from conventional audio or video tape reel or cassette cases in having a seal when closed and having an injection valve (and, if fitted, the pressure indicator). It is possible using the principles of the present invention to provide an archival container which is re-usable, resealable and easy to put media into or remove media from.

In the case of two-part plastics containers according to the present invention, these may consist of two separable portions or may consist, for example, of two portions hinged together via an integral or live hinge formed of the plastics material of the container itself. The interior of the container may be appropriately configured to receive one or more media units such as tape reels, tape cassettes, optically readable discs, films or the like. The media units may be placed directly in the interior of the container or, if desired, an interior tray may be provided for the reception of the media to be stored. Such a tray should not, of course, inhibit the purging of the atmosphere from the container during purging and venting. The configuration of the tray can vary (for use with the same external container) to enable different media to be securely stored therein. This is of particular value in reducing the numbers of shapes and sizes which the outer container needs to be made in relative to the very wide variety of shapes and sizes of media to be stored. For example, the same container may be provided with an interior tray for the reception of a single large size tape cassette or an alternative form of tray for the reception of two or more smaller size tape cassettes.

The exterior of the container may be provided with conventional features, for example an integrally moulded handle or other gripping means enabling easier handling of the container, an area for receipt of an adhesive label, on which an inscription denoting the content of the container may be made, barcoding or a pair of loops for fixing a security tag to render unauthorised opening of the container detectable.

In one preferred construction, the container may be configured to be held in closed condition by a movable catch which, when the container is closed and the catch engaged, covers access to an exhaust valve. This prevents, in the case of a manually operated exhaust valve, inadvertent operation with consequent loss of pressure. Other catches may be provided to enhance holding the container closed. They may be dimensioned so that as they are engaged, they aid the seal between the two parts.

In an alternative preferred construction, the container may consist of two separable portions, the one defining a cavity for the receipt of the medium to be preserved and the other constituting a lid which may itself be hollow to surround, when the container is closed, part of the medium, and which may be engaged with the cavity defining portion in two distinct positions, in one of which it is a loose, i.e. unsealed, fit on the cavity defining portion and in the other of which it is sealed tightly thereto. This may be achieved conveniently by providing that the lid and cavity defining portion have co-acting formations on them constituting a cam closure mechanism. Most preferably, the lid or a part thereof may be slid between a position in which the lid is sealed to the remainder of the container and an intermediate loose fitting position, in both of which positions the camming means are inter-engaged one with another, and an end position in which the camming means are disengaged from one another and the lid member may be removed from the cavity defining member.

The preservative atmosphere injected into the container to purge it and, following its closure and sealing to form the preservative atmosphere may be chosen from a wide variety of possibilities. However, for reasons of safety, simplicity and economy, the preferred atmosphere is of nitrogen. The inlet valve may have an appropriate fitting to enable nitrogen to be injected using suitable apparatus, for example a pressurised canister or conventional gas cylinder, conveniently via a pressure-reduction valve of known type to avoid over-pressurising the container.

BRIEF DESCRIPTION OF THE DRAWINGS

The invention is illustrated by way of example only with reference to the accompanying drawings in which.

DESCRIPTION OF THE PREFERRED EMBODIMENTS

Figure 1:
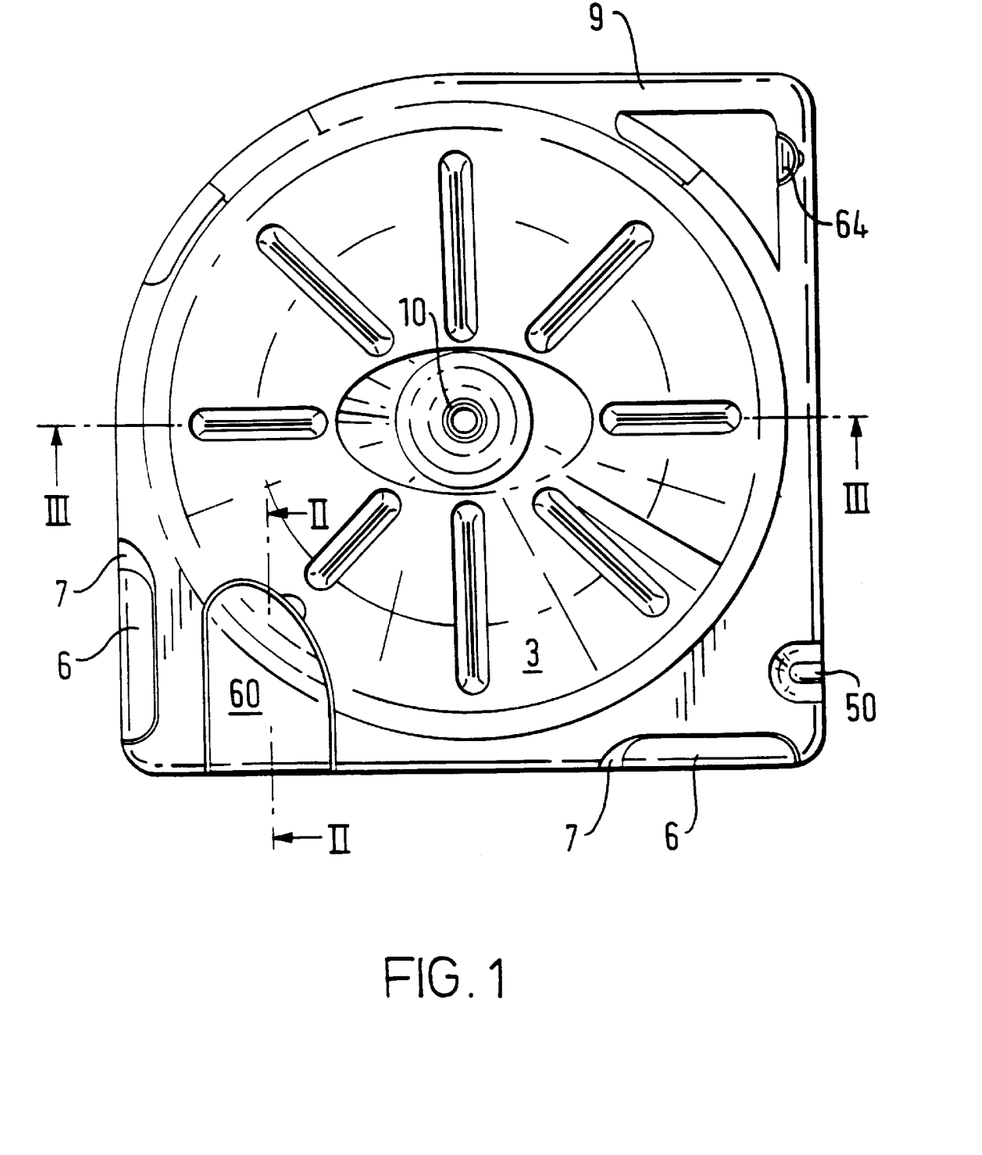
FIG. 1 is a plan view of a tape reel storage container
Figure 4:
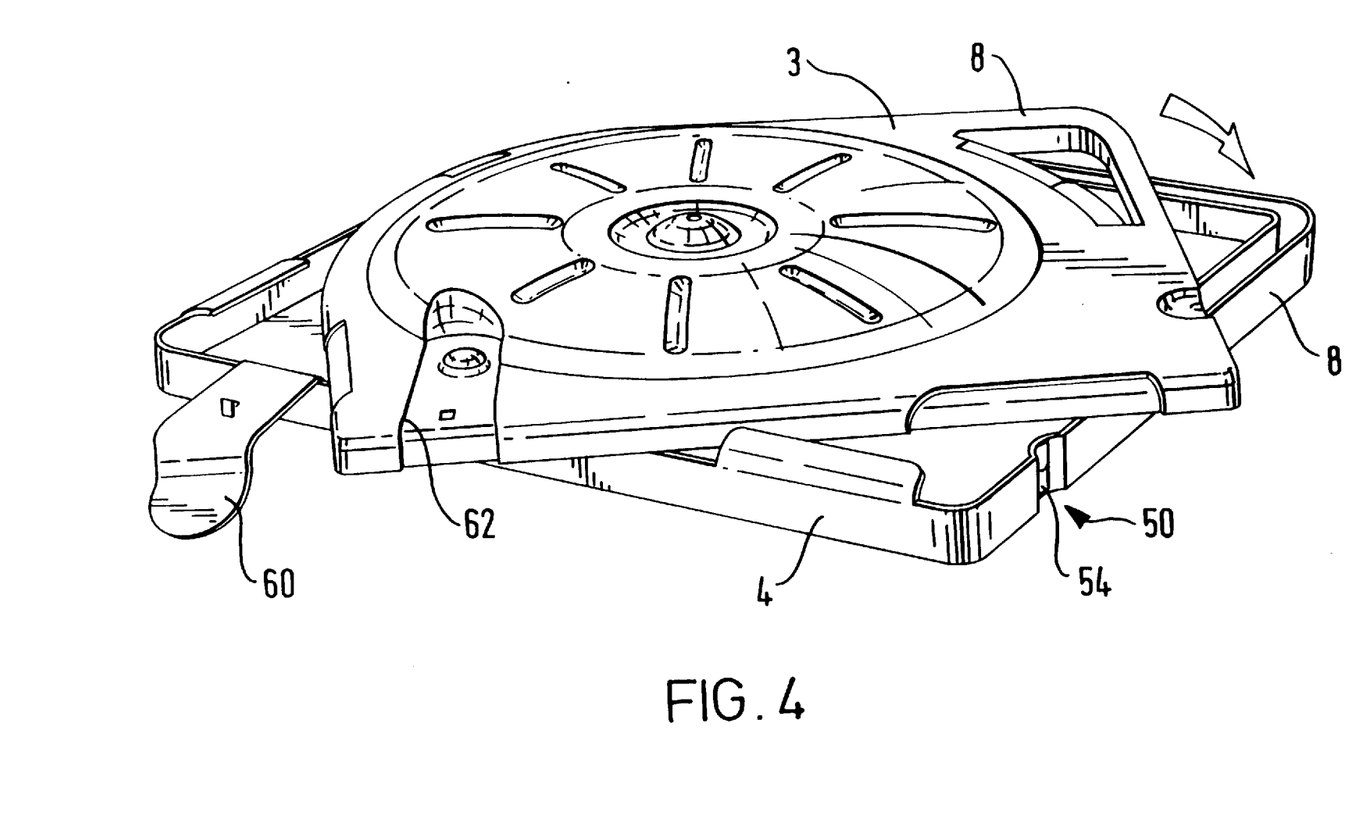
FIG. 4 is a perspective view of the container of FIG. 1 during assembly

Referring to FIG. 1, this shows the side view of a two-part plastics container for a reel of recording tape. As is easiest seen in FIG. 4, the container basically consists of two mouldings 3 and 4 which may be assembled together about a tape reel, one being rotatable with respect to the other to bring a series of moulded tabs 6 to overlie tab seats 7 on the upper moulding 3 of the container as shown in FIG. 4. Each part of the container has a moulded bridge portion 8, the two moulded bridge portions when registered when the container is closed forming a convenient handle 9 at one corner.

Figure 5:
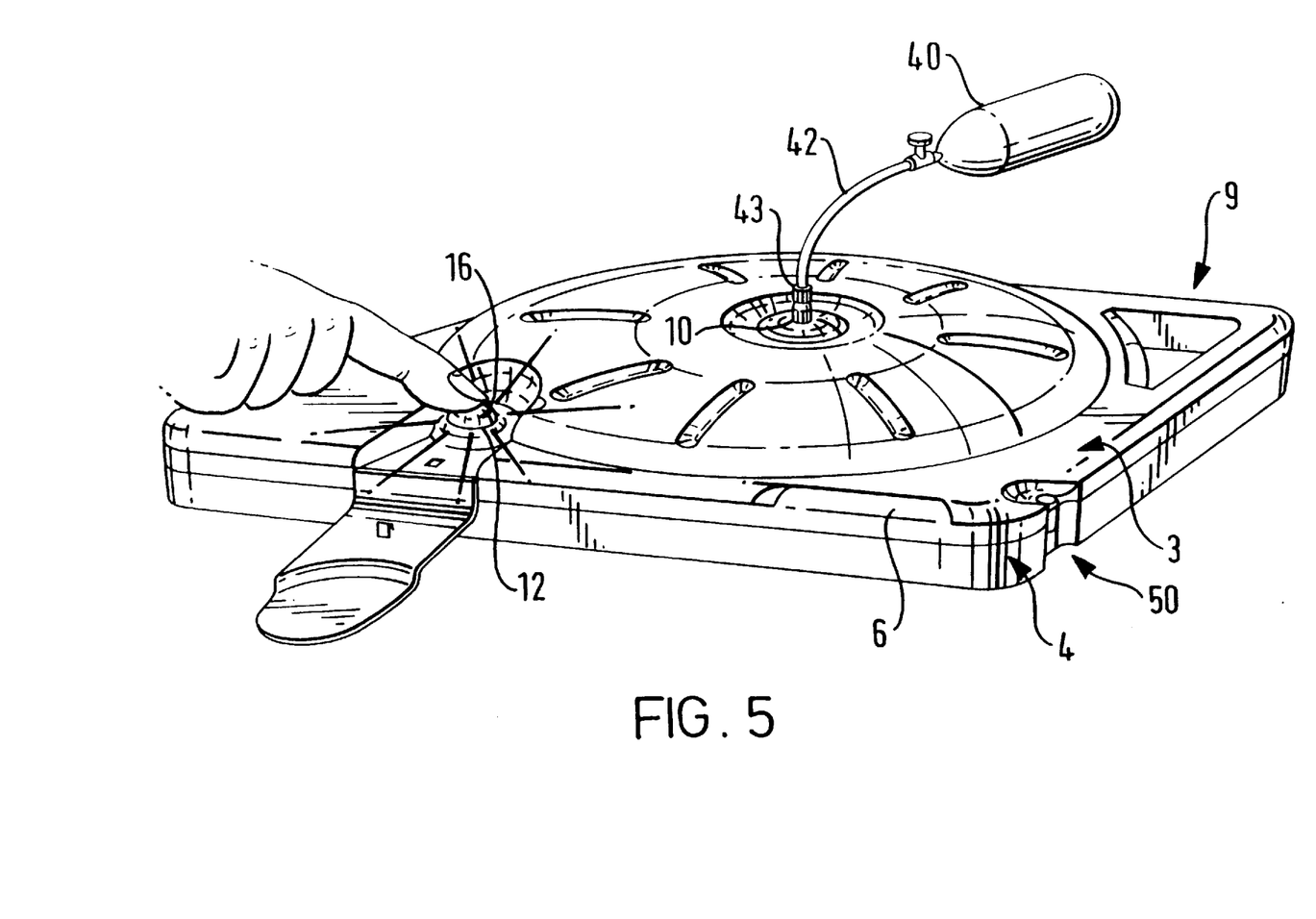
FIG. 5 is a perspective diagrammatic view of the closed container in FIG. 1 immediately following its closure and during replacement of the atmosphere within the container by a preservative atmosphere.

Located in the upper container portion as shown in FIG. 5 are an inlet valve and an exhaust valve 10 and 12 respectively. The construction of these valves is shown in more detail in FIGS. 2 and 3.

Figure 2:
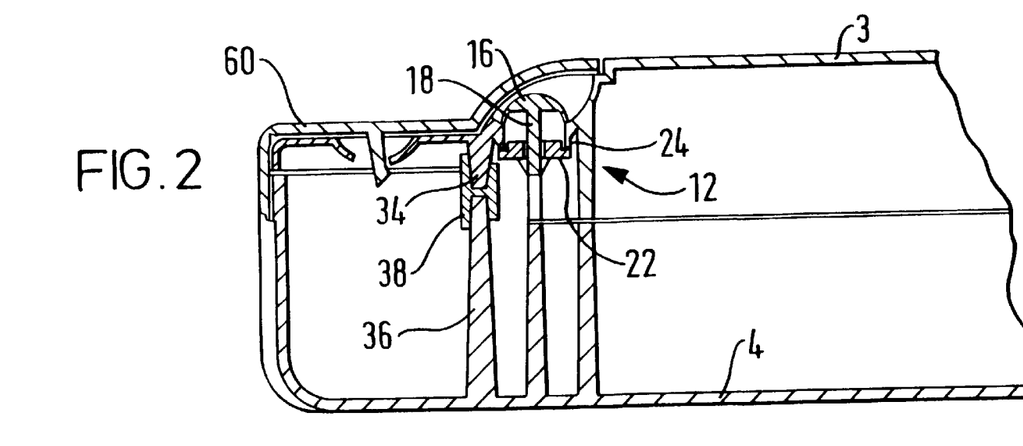
FIG. 2 is a diagrammatic partial cross-section along the lines II—II shown in FIG. 1

Referring to FIG. 2, the exhaust valve consists of a flexible button 16 integrally moulded into the container and having a depending shaft 18 on the end of which is mounted a resilient sealing disc 22. Disc 22 is so dimensioned as to be retained by the resilience of the plastics material from which the container is moulded against a seating 24. The periphery of the flexible portion of button 16 has a plurality of apertures in it so that if the button is depressed, if the interior of the container is pressurised, disc 22 comes away from seating 24 and the atmosphere within the container may flow past the seating and out through the apertures in button 16.

Figure 3:
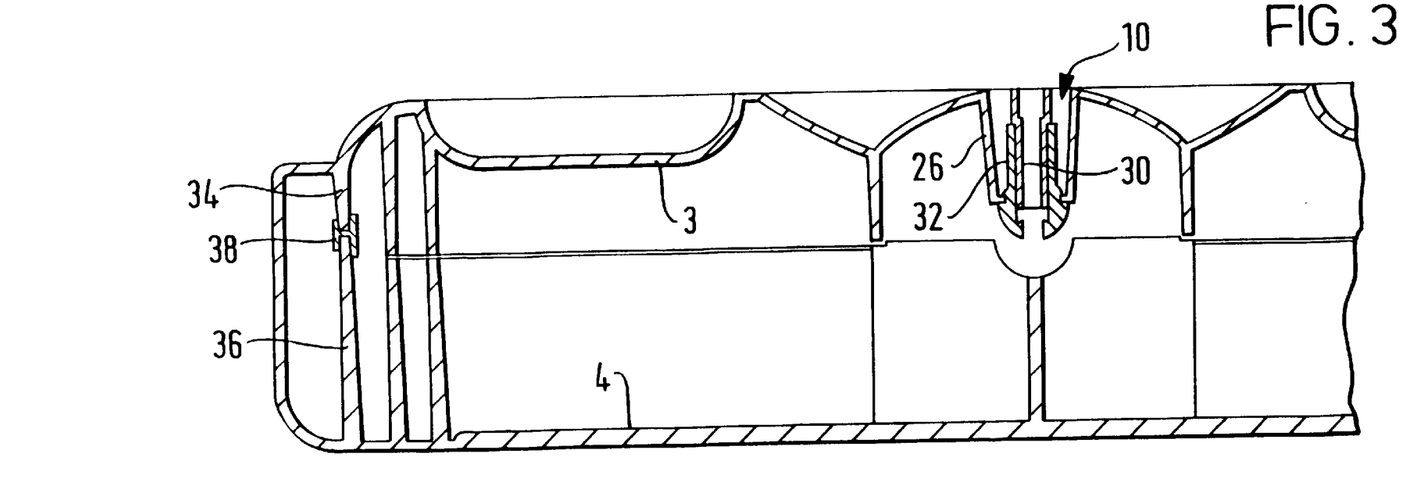
FIG. 3 is a diagrammatic partial cross-section along the lines III—III shown in FIG. 1

The inlet valve shown in detail in the cross-section of FIG. 3, is mounted in the centre of the upper portion of the container and consists of a suitably moulded socket 26 into which an appropriate fitting may be press fitted. The valve includes a resilient sleeve 30 which acts to seal a plurality of apertures in a surrounding plastics sleeve 32.

Both of the halves of the container have circular upstanding walls 34 and 36 of identical diameter. Attached, e.g. using a conventional adhesive to the wall 36 in the lower half of the container as shown in FIG. 3 is an H-section sealing ring 38. As can be seen in FIG. 3 when the two halves of the container are assembled together, wall 34 goes into the top of the H-section seal. The material of the seal and the material of the container are so chosen that the container can then be rotated to bring the two halves into register. The seal must thus slide relative to the wall 34 in moulding 3, but once the container is pressurised, as explained below, the two halves are effectively immovably locked together by the pressure on the right-hand bar (as seen in FIG. 3) of the H-section seal 38.

As clearest seen in FIG. 5, once the two halves of the container have been assembled together around a tape reel, button 16 is depressed and at the same time nitrogen is fed into the container via the valve 10 in the centre of the top from a suitable pressurised nitrogen bottle 40. The bottle may have a filling tube 42 attached thereto terminating in a suitable plug 43 which fits into the central valve in the upper half of the container. Because the button 16 is depressed, the atmosphere within the container exhausts through the apertures in the side of the button. Nitrogen injection is continued for a sufficient period of time to ensure that all of the original oxygen-containing atmosphere is flushed from the interior of the container, and the button 16 is then released. This seals the container and nitrogen is then injected until the desired increased pressure within the container is achieved.

Moulded into one corner of the lower portion of the container is a pressure indicator device 50. This may consist of a pre-formed flexible sleeve, the interior of which is in free communication with the interior of the container. The exterior of the sleeve is visible through a small window 54 moulded in container portion 4. As the pressure within the container rises, so the sleeve extends and the portion of it visible through window 54 changes from, e.g. blue to a green portion. Over-pressure may be indicated by having a further section of the sleeve coloured red which only appears behind window 54 if substantial excess pressure is applied to the interior of the sealed container. Of course, if that happens, a quick press on button 16 will reduce the internal pressure so that the green portion of the expanding sleeve shows behind the window.

In an alternative, the pressure indicator and exhaust valve may be combined in one unit so that once the desired overpressure is achieved, no further increase or pressure can take place. For example, above a given overpressure, the pressure indicator may act as a vent to atmosphere.

Once the appropriate pressure has been achieved within the container, a flexible tab 60 moulded integrally with the bottom of the container is folded over and located in a suitable engagement aperture in the top of the container. As easiest seen in FIG. 2, tab 60 covers the press button 16 thus securing it against inadvertent operation during subsequent handling of the sealed pressurised container. It also locates in a recessed area 62 preventing the container halves from being twisted one relative to the other, or separating.

In addition, supplemental snap fastener tabs may be provided, e.g. on handle 9 (denoted 64 in FIG. 1) to further secure the two container halves together.

The container may then be stored, e.g. on a suitable shelf, rack or the like, preferably in such an orientation that the window 54 is easily visible. A regular monitoring of the condition of a set of such containers stored on a shelf is then straightforward: one simply looks along the row and checks that all of the windows look green. If, for any reason, the pressure has dropped within the container, the window will appear blue and the container may then be moved from the shelf, checked and re-filled and pressurised or, if the container has for some reason failed, the tape may be removed from it and placed in a new container.

The specific container shown in the drawings and described above is designed for storing a single reel of magnetic tape. Analogous containers may be designed for storing, e.g. one or more magnetic tape cassettes, optical discs, films or other storage media.

Figure 6:
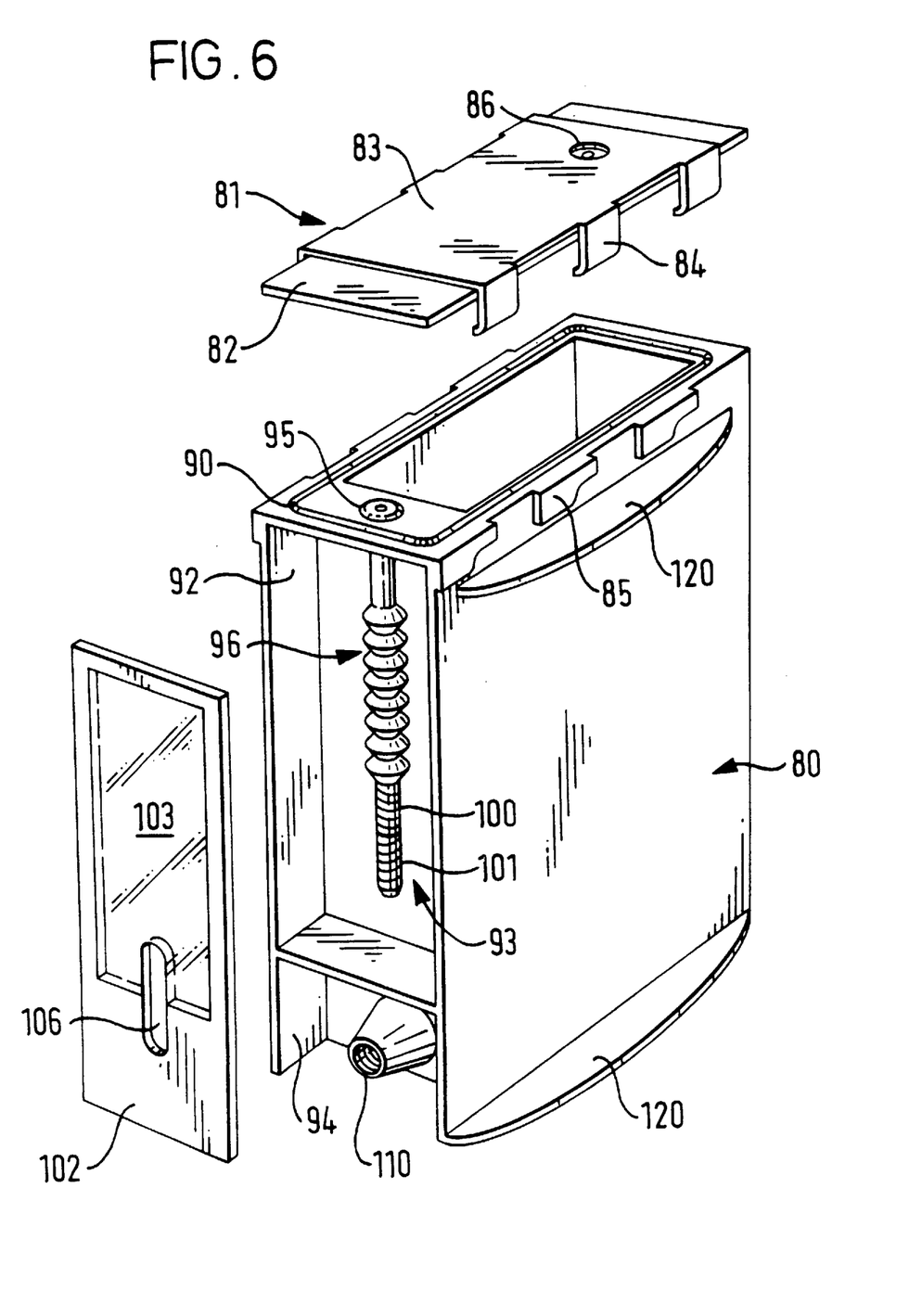
FIG. 6 is an exploded view of an alternative construction of container in accordance with the present invention.

Referring now to FIG. 6, this shows in exploded perspective view an alternative form of storage container in accordance with the present invention.

The container consists basically of a body portion 80 defining a cavity for receiving the material to be preserved and a lid portion 81 consisting of a flat plastics lid 82 and a slidable locking tab 83 set thereon. Locking tab 83 may be made of pressed metal and be retained on the plastics lid 82 by suitable formations.

As shown, locking tab 83 has on each side three depending camming members 84 which are designed to cooperate with three shaped lands 85 moulded integrally with body portion 80 at each side at the top. The mode of operation of these will be described further below.

Set in an annular groove at the top of body portion 80 is a resilient seal ring 90. The end wall construction of body portion 80 has two recessed compartments 92 and 94 separated by a wall 93 from the interior of the storage chamber. However, a portion of the "ceiling" of compartment 92 as shown in FIG. 6 has an aperture 95 to which is sealed one end of an expansible hollow rubber sleeve 96 which is open at its upper end which is sealed to aperture 95, and closed at its lower end.

As can be seen from FIG. 6, the rubber sleeve 96 has a bellows portion intermediate its ends and at its lower end has two coloured bands 100 and 101. For reasons which will be seen hereafter, band 101 is red and 100 is green.

Compartment 92 can be closed by a snap-in partially transparent member 102 which has a transparent portion 103 through which a label which, e.g. may be clipped to the side of member 102 adjacent rubber sleeve 96, may be seen. An aperture 106 in the base of member 102 allows the bottom of sleeve 96 to be viewed from the outside.

Located in the wall of the compartment 94 adjacent the cavity in body portion 80 is a one-way inlet valve 110 communicating with the interior of the container.

In the use of the container shown in FIG. 6, the first step is to place whatever medium it is desired to preserve inside the container. This can most conveniently be done by mounting the medium such as a disc, tape or the like in a suitable carrier (which may carry one or more than one unit) which is dimensioned simply to be dropped into the cavity in body portion 80. The carrier may include not only means for holding the medium itself, but, e.g. for holding related material such as a data record sheet or the like. A label identifying the contents may be slipped into the clip means on the back of member 102 and that member then snaps over compartment 92.

In an alternative construction, the member 102 may be non-transparent and ultrasonically welded into place, and in place of window 103 have a recess into which an adhesive label may be placed for identifying purposes.

The lid 81 is then placed on top of the body portion 80 with camming members 84 passing down the channel between adjacent lands 85. Locking tab 83 is then slid along lid 82 so that the camming members 84 and lands 85 interengage to hold the lid 82 loosely on top of body portion 80.

A source of preservative atmosphere, e.g. nitrogen, is now connected to valve 110 and the protective atmosphere injected into the container through valve 110. As soon as this commences, air previously in the container is displaced and exhausts under the lid past seal ring 90. After this has been done, e.g. for 5 to 10 seconds, the tab 83 is slid further to bring the caming members 84 underneath the end portions of the lands 85 with compression of lid 82 against seal 90, thus sealing the interior of the container. Continued injection of protective atmosphere now causes the interior of the now sealed container to become pressurised, and as that occurs, the bellows portion of rubber sleeve 96 causes the bottom portion of the sleeve to move downwardly past window 106. Thus if, with the container unsealed, the red portion 101 of sleeve 96 is visible, as the pressure builds up, so the red portion moves downwardly and the green portion 100 appears behind window 106. This can be seen by the operator who then stops injecting protective atmosphere and disconnects the injector from valve 110.

The container is now sealed and pressurised with the material to be preserved inside it. It may simply be placed on a shelf or, for example, placed in a suitable storage rack by means of ribs 120 moulded on the exterior of body portion 80 engaging in corresponding slots in a suitably dimensioned storage rack.

The container can then be left until it is desired to do something with the medium inside it. It is a simple matter to check that the pressure is being maintained inside the container since a brief look through window 106 will reveal the bottom of rubber sleeve 96. If a green colour is shown, it is clear that the container is still pressurised. If red, the pressure has clearly dropped for some reason and appropriate action to re-pressurise it can then be taken.

In order to assist manipulation of the container shown in FIG. 6, the locking tab 83 has an aperture 86 in its flat portion overlying lid 82, and lid 82 may have suitable markings on its upper surface as shown in the drawing which may be selectively viewed through the aperture in tab 83. For example, letters or pictographs indicating that the lid is removable, that it is in the purge position and that the container is sealed may be located in a line on the top of lid 82. As visible in FIG. 6, the letter "o" can be seen through window 86 when the container can be "o"pened.

Figure 7:
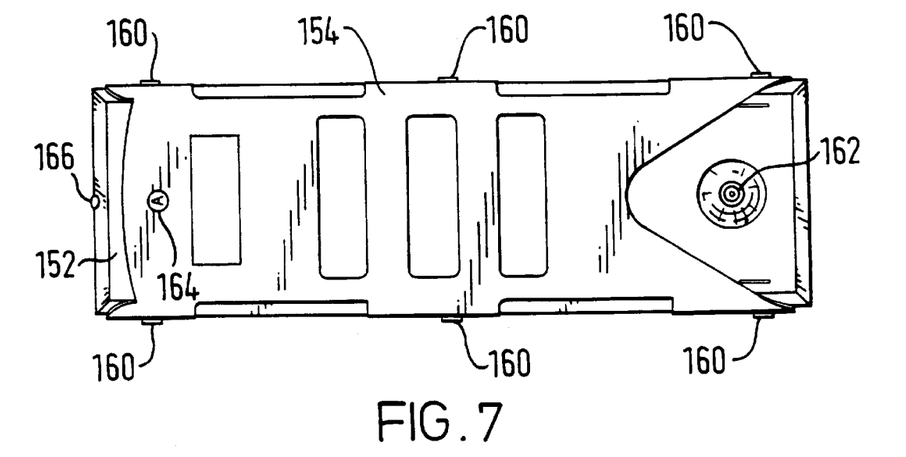
FIGS. 7 and 8 are respectively top and side views of a further alternative embodiment.
Figure 8:
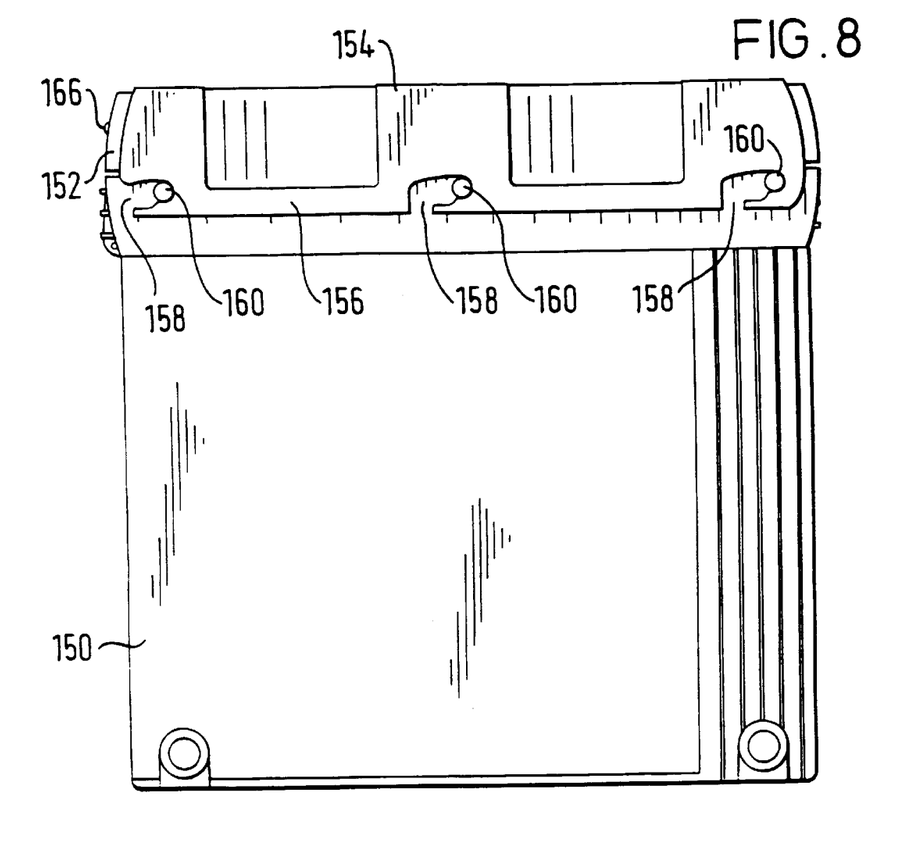

Referring now to FIGS. 7 and 8 of the drawings, these show yet a further embodiment of a media storage container in accordance with the invention. It consists basically of a generally square container body 150, a lid 152 and a sliding catch member 154. The sliding catch 154 overlays the lid 152 in the fashion of a saddle and has on each side a depending skirt 156 having in its lower edge three contoured slots 158. The spacing of these slots corresponds to the spacing of three studs 160 integrally moulded on each side of the base 150. In the position shown in FIGS. 7 and 8, the container is shown in the sealed position with lid 152 firmly held against base 150. A sealing member not visible in the drawings seals the two members together enabling the interior to be pressurised via a gas injection valve 162 set in the right hand end of lid 152 as shown in the drawings.

A window 164 is pierced through catch member 154 and through it can be seen in FIG. 7 the letter "A" standing for "archived".

Set in the left hand end of the lid as shown in the drawing is the transparent hemispherical ended casing of a red LED 166.

Set within the lid and not visible in the drawing is a miniature electronic circuit and a housing for a battery of the type used to power hearing aids or digital watches, to power the circuit. The circuit also includes a switch member which may be operated by relative sliding movement of catch member 154 along lid 152.

If the catch member 154 is slid to the right relative to lid 152, it can be seen that the studs 160 may freely pass out of the end of the slot, thus enabling the lid and catch member to be removed as a unit. This allows access to the interior of the base 150 into which media to be archived are placed. Thereafter, the lid is replaced and the catch member 154 slid so that the individual studs 160 are located essentially half way along the generally horizontal upper portions (as shown in FIG. 8) of each slot 158. It can be seen that in this position, the lid is a loose fit on the base 150 so that if nitrogen is now injected via valve 162, it acts to purge the atmosphere within the container and replace it with nitrogen. When this purging process is completed, catch member 154 is slid into the position shown in the drawings which, because of the contour of each slot 158, urges lid 152 firmly against the base 150 thus sealing the interior of the container. At the same time, by means of an actuation arm which is not shown in the drawings, the switch is actuated and the electronic circuit causes LED 166 to flash periodically. The actuation of the switch and therefore of the flash shows the user that the lid is firmly sealed on to the container. Nitrogen may now be injected via valve 162 to produce the desired elevated pressure within the container which may then simply be placed on an appropriate shelf for storage.

The power consumption of the electronic circuit may be extremely low enabling the LED to continue flashing, e.g. for three years for a normal battery life. It is good management of archive storage periodically, albeit over long timescales, to inspect, check and test the material being archived. Failure of the LED to continue flashing when the power supply from the battery eventually runs out is a simple and clear sign that such a maintenance inspection is required. Part of the inspection, of course, involves replacement of the battery with a new one.

If desired, the electronic circuit which drives diode 166 may be designed to cause the LED to indicate a change in pressure or oxygen ingress. Such a change in the appearance of LED 166 is easily detected by simple visual inspection whereon action may be taken to open the container and re-archive the material prior to the maintenance inspection mentioned above.

The pressure indicator in the container according to the present invention may be of a simple mechanical type as described above. Alternatively it can be envisaged that the pressure indicator may take the form of an electronic pressure indicator powered either by battery or by a photovoltaic cell of the type used in "solar powered calculators".

It is possible to detect pressure loss by other means, and, indeed, circumstances can be envisaged in which adverse conditions may arise in the interior of the storage container without actual pressure loss taking place. For example if, for any reason, oxygen is generated inside the container, this can be detected using a suitable electronic detector and that may be useful in certain circumstances since it will react either to the generation of oxygen under pressure within the interior of the container or, of course, to the container seal failing, in which case oxygen will permeate to the interior from the ambient atmosphere. It is possible to conceive that such an electronic unit might, e.g. light up a red light emitting diode mounted on a portion of the casing. In a very simple (and therefore potentially highly reliable and relatively inexpensive) approach, a light-emitting indicator such as a red LED may be connected in series with an oxygen activated chemical cell or battery, oxygen activation being prevented by a suitable seal prior to the container being put to use to store media. An ideal seal is one designed to fail when the unit is pressurised, so that any subsequent failure of the container sealing, which allows the ingress of atmospheric oxygen, causes the cell or battery to activate and the light-emitting indicator to illuminate so that loss of sealing can instantly be seen in a row or stack, the indicator being, of course, positioned where it can be seen when the container is e.g. stacked on a shelf.

What is claimed is:

1. In a media storage container having a body portion and a lid, the body portion defining a cavity for the media to be stored and the lid being movable from a position in which a medium to be preserved may be put into or extracted from the body portion to a position in which the body portion and the lid form a closed sealed container about the medium; an injection valve enabling the injection of a protective atmosphere from a source outside the container into the interior of the container under pressure; and venting means enabling the escape of atmosphere from within the container when the protective atmosphere is injected into the container at a pressure higher than the ambient atmosphere outside the container;

the improvement comprising co-acting formations on the body portion and lid constituting a cam closure mechanism, which in a first position, maintains the lid with a loose, unsealed fit on the body portion enabling venting of the container while continuing to inject protective atmosphere to allow the inside of the container to be purged, and in a second position provides a camming action of the cam closure mechanism, which seals the lid to the body portion to enable the cavity to be pressurized.

2. The media storage container of claim 1, wherein the injection valve is mounted in the lid.

3. The media storage container of claim 1 further including a sealing member between the lid and the body portion.

4. The media storage container of claim 1 further including an exhaust valve adapted to open automatically in response to a given excess of pressure between the interior and exterior of the container.

5. The media storage container of claim 1, wherein the lid comprises:

a cover member adapted to close the cavity in the body member; and a movable sliding catch which carries second formations which are adapted to co-act with the first formations on the body member to constitute said cam closure mechanism.

6. The media storage container of claim 5 wherein the catch has:

a central portion overlying the cover member; and lateral members extending to overlie the sides of the body portion, the lateral members having cam-configured slots therein adapted to co-act with studs mounted on said body portion to constitute said cam closure mechanism.

7. The media storage container of claim 1 further including means for indicating the pressure inside the container relative to the pressure on the exterior.

8. The media storage container of claim 1 wherein the container has incorporated therein a visually observable indicator giving a clear indication distinguishing any one or combination of three conditions: the pressure inside the container is substantially equal to the atmospheric pressure outside the container, the pressure within the container is within a desired range of pressure above ambient pressure; and the pressure within the container is too high.

9. The media storage container of claim 1 further including a sealable document receptacle into which documents or other information-bearing media may be placed and which is sealable to prevent egress of contaminants from the documents during purging and subsequently into the internal protective atmosphere.

10. The media storage container of claim 1 further including a carrying handle.

11. The media storage container of claim 1 further including an interior tray for reception of media to be stored.

12. The media storage container of claim 1 further including means for detecting and indicating the presence of oxygen and/or moisture in the interior thereof.

* * * * *